(12) United States Patent
Golova et al.

(10) Patent No.: US 7,829,644 B2
(45) Date of Patent: Nov. 9, 2010

(54) GEL-FORMING REAGENTS AND USES THEREOF FOR PREPARING MICROARRAYS

(75) Inventors: Julia Golova, Burr Ridge, IL (US); Boris Chernov, Burr Ridge, IL (US); Alexander Perov, Woodridge, IL (US)

(73) Assignee: UChicago Argonne, LLC, Chicago, IL (US)

( * ) Notice: Subject to any disclaimer, the term of this patent is extended or adjusted under 35 U.S.C. 154(b) by 971 days.

(21) Appl. No.: 11/550,730

(22) Filed: Oct. 18, 2006

(65) Prior Publication Data

US 2007/0249797 A1  Oct. 25, 2007

Related U.S. Application Data

(60) Provisional application No. 60/793,176, filed on Apr. 19, 2006.

(51) Int. Cl.
    *C08L 20/58* (2006.01)
    *C08L 20/68* (2006.01)

(52) U.S. Cl. .................. 526/306; 526/303.1; 526/304; 526/307; 526/307.3; 526/307.4; 526/319; 526/320

(58) Field of Classification Search .............. 526/303.1, 526/304, 306, 307, 307.3, 307.4, 319, 320, 526/210
    See application file for complete search history.

(56) References Cited

U.S. PATENT DOCUMENTS

| | | | | |
|---|---|---|---|---|
| 4,600,641 | A * | 7/1986 | Ogawa et al. | 204/616 |
| 5,702,696 | A * | 12/1997 | Mandeville et al. | 424/78.12 |
| 6,174,683 | B1 | 1/2001 | Hahn et al. | |
| 6,521,431 | B1 * | 2/2003 | Kiser et al. | 435/177 |
| 6,656,725 | B2 | 12/2003 | Mirzabekov et al. | |
| 6,692,972 | B1 | 2/2004 | Yershov et al. | |
| 2004/0241713 | A1 | 12/2004 | Mirzabekov et al. | |

FOREIGN PATENT DOCUMENTS

WO  WO 2005/120701  * 12/2005

OTHER PUBLICATIONS

Beaucage, "Strategies in the Preparation of DNA Oligonucleotide Arrays for Diagnostic Applications," *Current Medicinal Chemistry*, 8: 1213-1244 (2001).

Boncheva et al., "Design of Oligonucleotide Arrays at Interfaces," *Langmuir*, 15: 4317-4320 (1999).

Broude et al., "DNA microarrays with stem-loop DNA probles: preparation and applications," *Nucleic Acids Research*, 29(19): e92 (2001).

Campas et al., "DNA biochip arraying, detection and amplification strategies," *Trends in Analytical Chemistry*, 23 (1): 49-62 (2004).

Charles et al., "Fabrication and Surface Characterization of DNA Microarrays Using Amine- and Thiol-Terminated Oligonucleotide Probes," *Langmuir*, 19: 1586-1591 (2003).

Chrisey et al., "Covalent attachment of synthetic DNA to self-assembled monolayer films," *Nucleic Acids Research*, 24 (15): 3031-3039 (1996).

Christensen et al., "Arrays in biological and chemical analysis," *Talanta*, 56: 289-299 (2001).

Coffinier et al., "Semicarbazide-Functionalized Si(111) Surfaces for the Site-Specific Immobilization of Peptides," *Langmuir*, 21: 1489-1496 (2005).

Guo et al., "Direct fluorescence analysis of genetic polymorphisms by hybridization with oligonucleotide arrays on glass supports," *Nucleic Acids Research*, 22 (24): 5456-5465 (1994).

Houseman et al., "Carbohydrate Arrays for the Evaluation of Protein Binding and Enzymatic Modification," *Chemistry & Biology*, 9: 443-454 (2002).

Joos et al., "Covalent Attachment of Hybridizable Oligonucleotides to Glass Supports," *Analytical Biochemistry*, 247: 96-101 (1997).

Kelly et al., "Radical-generating coordination complexes as tools for rapid and effective fragmentation and fluorescent labeling of nucleic acids for microchip hybridization," *Analytical Biochemistry*, 311: 103-118 (2002).

Kumar et al., "A Rapid Method for the Construction of Oligonucleotide Arrays," *Bioconjugate Chem.*, 14 (3): 507-512 (2003).

Predki, "Functional protein microarrays: ripe for discovery," *Current Opinion in Chemical Biology*, 8: 8-13 (2004).

Raddatz et al., "Hydrazide oligonucleotides: new chemical modification for chip array attachment and conjugation," *Nucleic Acids Research*, 30 (21): 4793-4802 (2002).

(Continued)

*Primary Examiner*—Helen L. Pezzuto
(74) *Attorney, Agent, or Firm*—Barnes & Thornburg LLP; Alice O. Martin

(57) ABSTRACT

New gel-forming reagents including monomers and cross-linkers, which can be applied to gel-drop microarray manufacturing by using co-polymerization approaches are disclosed. Compositions for the preparation of co-polymerization mixtures with new gel-forming monomers and cross-linker reagents are described herein. New co-polymerization compositions and cross-linkers with variable length linker groups between unsaturated C=C bonds that participate in the formation of gel networks are disclosed.

1 Claim, 4 Drawing Sheets

OTHER PUBLICATIONS

Rehman et al., "Immobilizatoin ofacrylamide-modified oligonucleotides by co-polymerization," *Nucleic Acids Research*, 27 (2): 649-655 (1999).

Rogers et al., "Immobilization of Oligonucleotides onto a Glass Support via Disulfide Bonds: A Method for Preparation of DNA Microarrays," *Analytical Biochemistry*, 266: 23-30 (1999).

Rubina et al., "Hydrogel-Based Protein Microchips: Manufacturing, Properties, and Applications," *BioTechniques*, 34: 1008-1022 (2003).

Rubina et al., "Hydrogel drop microchips with immobilized DNA: properties and methods for large-scale production," *Analytical Biochemistry*, 325: 92-106 (2004).

Soellner et al., "Site-Specific Protein Immobilization by Staudinger Ligation," *J. Am. Chem. Soc.*, 125: 11790-11791 (2003).

Talapatra et al., "Protein microarrays: challenges and promises," Database: Future Medicine, 3 (4): 527-536 (2002) (Abstract).

van Berkum et al., "DNA microarrays: raising the profile," *Current Opinion in Biotechnology*, 12: 48-52 (2001).

Vasiliskov et al., "Fabrication of Microarray of Gel-Immobilized Compounds on a Chip by Copolymerization," *BioTechniques*, 27: 592-606 (1999).

Yershov et al., "DNA analysis and diagnostics on oligonucleotide microchips," *Proc. Natl. Acad. Sci.*, 93: 4913-4918 (1996).

Yousaf et al., "Diels-Alder Reaction for the Selective Immobilization of Protein to Electroactive Self-Assembled Monolayers," *J. Am. Chem. Soc.*, 121: 4286-4287 (1999).

Sage, "Biochips Go High-Tech," *Today's Chemist at Work*, 44-48 (Jul. 2004).

\* cited by examiner

MONOMERS

AA = Acrylamide
H₂NOCHC=CH₂

MA = Methacrylamide
H₂NOC(CH₃)C=CH₂

HEMA = N-(Hydroxyethyl)-methacrylamide
HOCH₂CH₂NHCOCH(CH₃)=CH₂

CROSS-LINKERS

A = N,N-methylenebisacrylamide
CH₂=CHCONH-CH₂-NHCOCH=CH₂

B = 2-Hydroxypropylene-1,3-bismethacrylamide
CH₂=C(CH₃)CONHCH₂CH(OH)CH₂NHCOC(CH₃)=CH₂

C = N,N-dimethacryloyl-1,4-diaminobutane-2,3-diol
CH₂=C(CH₃)CONHCH₂CH(OH)CH(OH)CH₂NHCOC(CH₃)=CH₂

D = 2,2-(Ethylenedioxy)bis(ethylmethacrylamide)
CH₂=C(CH₃)CONH(CH₂)₂O(CH₂)₂O(CH₂)₂NHCOC(CH₃)=CH₂

FIG. 1

GEL-FORMING REAGENTS AND USES THEREOF FOR PREPARING MICROARRAYS

This applications claims priority to U.S. Ser. No. 60/793,176 filed Apr. 19, 2006.

The United States Government has rights in this invention under Contract No. DE-AC02-06CH11357 between the United States Department of Energy and the University of Chicago representing UChicago Argonne LLC.

BACKGROUND

DNA and protein microarrays have become widely used tools for performing high throughput analysis in biology, medicine, chemistry, etc. One of the most promising platforms in microarrays manufacturing and application is based on three-dimensional (3D) gel substrates used for the immobilization of different kinds of probes forming microarrays. The last significant achievements in this area belong to the development of co-polymerization technology of microarray fabrication, also known as gel or hydrogel drop microarrays. Such microarrays are based on the co-polymerization of oligonucleotide, or peptide probes, modified with one or more unsaturated functional groups admixed with a gel-forming mixture, which is subsequently applied as a spot on glass or plastic substrate and allowed to polymerize under UV exposure to form a gel-drop microarray. The advantages of this methodology are that the produced 3D microarrays have a higher capacity for analyte detection than conventional microarrays, which may lead to increased sensitivity, especially for hybridization assays. By increasing the sensitivity of the hybridization assay, experiments providing the desired result are run using lower quantities of analyzed sample in comparison to conventional 2D microarrays. Additionally, 3D microarrays often provide a large amount of spacing between the immobilized probes; and allow for the creation of a water volume, which surrounds immobilized molecules. Furthermore, the efficiency and kinetics of the hybridization depend on a number of factors, including the diffusion rate of target DNA fragments and the accessibility of oligonucleotide probes.

Currently, microarrays affixed with DNA and peptides are widely utilized for the creation of platforms for various applications regarding nucleic acid and protein detection and identification. Such methods employ co-polymerization where the oligonucleotide or peptide probes are combined with the gel forming mixture, applied as a spot on a glass or plastic substrate and are polymerized via ultraviolet (UV) exposure to form the biochip. Detection and identification of genetic materials on DNA and protein biochips is based upon their interaction with target molecules isolated from biological samples with probes immobilized on gel elements. One method to increase the efficiency of hybridization is to improve the properties of the gel network used for the manufacture of the biochip. The most popular gel-forming compositions currently used are acrylamide and methacrylamide as gel-forming monomers, and methylenebisacrylamide as a cross-linking reagent. However, both of these widely used gel-forming monomers suffer from relatively high volatility and demonstrated low stability often resulting in spontaneous polymerization of co-polymerization mixtures. High volatility of monomers can cause significant changes in concentrations of copolymerization compositions during printing procedure especially for prolonged manufacturing process of microarrays containing numerous numbers of gel drops. Therefore resulting microarrays after polymerization will contain gel drops with different sizes and compositions that can lead to incorrect interpretation of results following hybridization experiments. It has also been observed that co-polymerization mixtures using acrylamide or methacrylamide as gel-forming monomers spontaneously polymerize and need to be operated and stored with special care if repeatedly used.

Developing new and novel approaches for the preparation of co-polymerization mixtures remains a difficult yet important task for microarray technology, and alternative and potentially optimal gel-forming monomers and cross-linkers that might be applicable to the manufacture of microarrays have yet to be studied.

SUMMARY

The present invention relates to new gel-forming reagents including monomers and cross-linkers, which can be applied to gel-drop microarray manufacturing by using co-polymerization approaches. Illustrative examples of such monomers and linkers are shown in FIG. 1. Compositions for the preparation of co-polymerization mixtures with new gel-forming monomers and cross-linker reagents are described herein. Presented herein are new co-polymerization compositions and cross-linkers with variable length linker groups between unsaturated C=C bonds that participate in the formation of gel networks. The compositions permit the porosity of the gel elements to be selectively modified and provide better accessibility of immobilized probes and faster diffusion of target molecules. The presence of amino and hydroxyl groups in gel-forming monomers provides the flexibility to change the hydrophilic-hydrophobic properties of gel drop elements. The chemical-physical properties of substances described herein as gel-forming monomers have been shown to decrease the volatility of co-polymerization mixtures and improve their stability to spontaneous polymerization.

In one embodiment described herein, the gel-forming monomers and cross-linker compounds each include at least one unsaturated acid functional group, or derivative thereof, such as an acrylamide, acrylate, methacrylate, methacrylamide, enoic acid, and/or enamide, including combinations thereof.

Additionally, it is to be understood that as used herein, the term "unsaturated carboxylic acid" or "carboxylic acid" or polymeric material or derivative thereof includes a variety of substituted and unsubstituted acrylic acids, methacrylic acids, cyanoacrylic acids, crotonic acids, maleic acids, fumaric acids, itaconic acids, citraconic acids, mesaconic acids, and the like, and derivatives thereof, such as esters and amides.

Likewise, it to be understood that as used herein, the term acrylamide refers both to substituted and unsubstituted propenoic acid amides. Illustratively, acrylamides include, but are not limited to, propenoic acid amides, alkylated propenoic acids, cyanogenated propenoic acid amides, and the like. In addition, it is to be understood that as used herein, acrylamide starting materials that are used to prepare the compounds described herein may be esters or amides.

The gel-forming reagent comprises one or more components selected from the group consisting of gel forming monomers, cross-linkers, compositions for preparing co-polymerization mixtures, and combinations thereof.

Without being bound by theory, it is suggested and appreciated that as the gel-forming reagent is either reduced or augmented (for example, by modifying the distance between the saturated C=C bonds of the gel forming reagent), potential intra- or intermolecular steric interactions or solvent effects (for example, adjusting the hydrophobicity/hydrophilicity which prohibits/permits water to surround the immobilized biomolecules, respectively) may increase the efficiency of hybridization. The co-polymerization compositions described herein may provide better accessibility to immobilized biomolecular probes and therefore increase the efficiency of hybridization analysis.

In one embodiment, the gel-forming monomer comprises a compound of the formula:

$$H_2C=C(R^1)CO-X-Z$$

wherein $R^1$ is hydrogen, alkyl, carboxylate, or a carboxylate derivative;

X is —NH— or —O—; and

Z is selected from alkyl, cycloalkyl, alkyloxy, and polyalkyloxy, where each of the foregoing is substituted with at least one group selected from hydroxy, thiol, amino; or Z is selected from carbohydrates and carbohydrate derivatives.

In another embodiment, the cross-linker reagent is a compound of the formula:

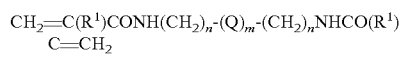

wherein n is independently selected in each instance from an integer in the range from 0 to about 10, $R^1$ is selected from hydrogen, alkyl, carboxylate, and carboxylate derivatives;

Q is independently selected in each instance from alkylene, alkyleneoxy, alkyleneamino, alkenethio, and carbonyl;

and m is an integer from 1 to about 10.

In another embodiment, a method for immobilizing biomolecules onto a substrate is described herein. The biomolecules useful in the method include at least one unsaturated acid functional group, or derivative thereof. The method includes the steps of:

(a) mixing the biomolecule with a gel-forming composition to form a mixture;
(b) applying the mixture to the substrate; and
(c) polymerizing the mixture;

where the gel-forming reagent includes one or more of the monomers and cross-linkers, and derivatives thereof, described herein. In one aspect, the substrate is selected from glass, quartz, plastics, silicon, and the like.

It is to be understood from the formulae described herein that the cross-linkers an cross-linking reagents may be either symmetrical and asymmetrical. For example, the cross linkers may illustratively include an acrylate group at one end, and a methacrylate group at the other end. Alternatively, the chain of atoms that connects the two unsaturated acid functional groups, or derivatives thereof, at the ends of the cross-linkers may be symmetrical, such as an alkylene chain, oxyalkyloxy chain, and the like, or unsymmetrical, such as oxyalkylaminoalkyl chain, and the like.

It is to be understood that the biomolecule may under normal or natural circumstances include at least one unsaturated acid functional group, or derivative thereof. Alternatively, the biomolecule containing at least one unsaturated acid functional group, or derivative thereof, may be prepared using conventional synthetic procedures. For example, nucleic acid biomolecules, such as DNAs, DNA fragments, and other oligonucleotides that include acrylate or methacrylate functional groups may be prepared using automated synthesizers and corresponding modifiers, such as those described in U.S. patent application Ser. No. 11/066,791, filed Feb. 26, 2005, the disclosure of which is incorporated herein by reference. Similarly, peptide and protein biomolecules that include acrylate or methacrylate functional groups may also be prepared using automated synthesizers, where amino acid analogs that include the required unsaturated carboxylic acid functional groups are used.

In another illustrative embodiment, the immobilized biomolecule is a nucleic acid, and the included unsaturated acid functional group may be covalently attached at various locations on the nucleic acid, including the 3' end, and the 5' end. In another illustrative embodiment, the immobilized biomolecule is a peptide or protein, and the included unsaturated acid functional group may be covalently attached at various locations on the peptide or protein, including the N-terminus.

DEFINITIONS AND ABBREVIATIONS

Biomolecule—any organic molecule that was, or could be, an essential part of a living organism such as DNA fragments, peptides, proteins, lipids, affinity ligands, and the like.

Biomolecule Complex—A noncovalent aggregation or association of a biomolecule, including ribonucleic acids, fragments of DNA or RNA, peptides, proteins, lipids, and tissues, and another organic or inorganic compound, such as metal ions, other biomolecules, and the like. It is understood that these complexes can be multiples of biomolecule, and/or biomolecules that are ligated and/or modified.

DNA—deoxyribonucleic acid

HPLC—high pressure liquid chromatography.

Hydrogel—a colloidal gel in which water is the dispersion medium.

Linker: a polyfunctional molecule containing functional groups that may connect different parts of a chemical structure.

FAB-MS—Fast Atom Bombardment mass spectrometry

Microarray: a predetermined arrangement of molecules relative to each other connected to a support, also referred to as a chip, DNA chip, DNA microarray, DNA array, microchip, peptide chip, or peptide array.

MW—molecular weight.

Nanoscience—primarily the extension of existing sciences into the realms of the extremely small (nanomaterials, nanochemistry, nanobio, nanophysics, etc.); it concerns itself with the study of objects which are anywhere from hundreds to tens of nanometers in size.

Oligonucleotide: A nucleotide sequence (DNA or RNA) having about 6 or more nucleotides, and illustratively in the range from about 6 to about 100 nucleotides.

PEG—polyethylene glycol.

Phosphoramidite—phosphoramide derivatives of nucleosides used in chemical solid phase oligonucleotide synthesis.

RNA—ribonucleic acid

Solid support—carrier for automated solid phase oligonucleotide synthesis, illustratively control pore glass, long-chain control pore glass.

UV—ultraviolet.

BRIEF DESCRIPTION OF THE DRAWINGS

FIG. 1 shows illustrative examples of monomers (compounds MA, AA, and HEMA) and cross-linkers (compounds A-D).

Figure 3:
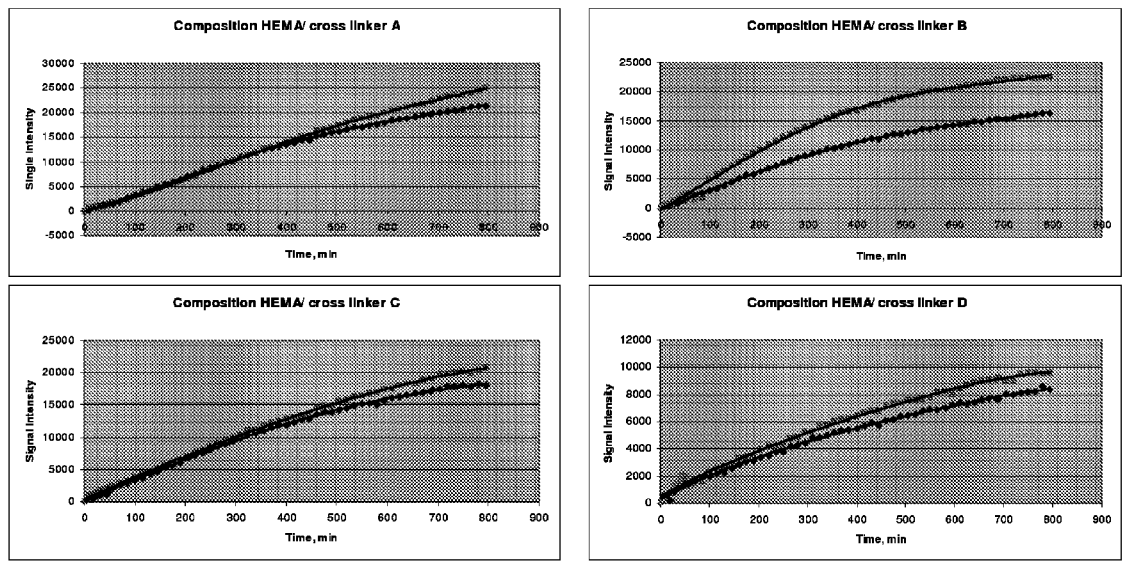

FIG. 3 shows the results of hybridization experiments on gel-drop microarrays an immobilized 20-mer oligonucloetide probe and a 100-mer target DNA fragment, where the probe was immobilized by various gel forming compositions described herein and that include HEMA (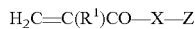, 0.47 M HEMA, 0.0235 M cross-linker A, B, C, or D, 65% glycerol, 0.2 M sodium-phosphate buffer (pH 7.2)) compared to the conventional gel forming composition prepared from acrylamide and N,N-methylenebisacrylamide (♦, 0.47 M acrylamide, 0.0235 M methylenebisacrylamide, 65% glycerol, 0.2 M sodium-phosphate buffer (pH 7.2)).

Figure 4:
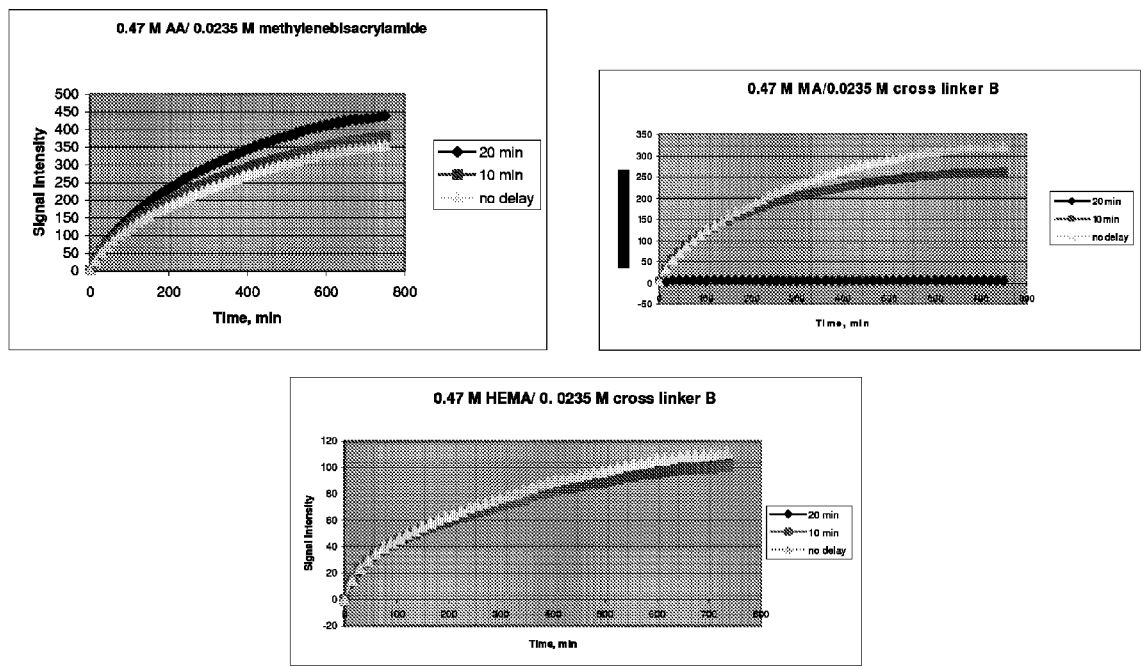

FIG. 4 shows the results of volatility tests comparing the stability of various gel-forming mixtures over time and as a function of any delay prior to applying the composition to the substrate.

DETAILED DESCRIPTION

New gel-forming reagents are described herein, including monomers and cross-linkers and compositions thereof, which can be applied in the manufacturing of gel-drop microarrays with immobilized biomolecules by co-polymerization. Illustrative monomers and cross-linkers are shown in FIG. 1.

In one illustrative embodiment new gel-forming monomers (FIG. 1, compounds M1, M2) represent derivatives of methacrylic acids with improved properties of gel-forming mixtures to be used for co-polymerization technique. The presented compounds possess low volatility and higher stability to spontaneous polymerization if compare with co-polymerization mixtures using acrylamide or methacrylamide as gel-forming monomers.

The described new co-polymerization compositions employ cross-linker reagents with variable length of linker groups between unsaturated C=C bonds participating in formation of gel networks (FIG. 1, compounds A-D). It allows changing the porosity of gel elements and provides better accessibility of immobilized probes and faster diffusion of target molecules.

Presence of amino and hydroxylic groups in gel-forming reagents provide possibility to change hydrophilic-hydrophobic properties of gel drop elements (FIG. 1).

The gel-forming reagent comprises one or more components selected from the group consisting of gel forming monomers, cross-linkers, compositions for preparing co-polymerization mixtures, and combinations thereof.

In one embodiment, the gel-forming monomer comprises a compound of the formula:

$$H_2C=C(R^1)CO-X-Z$$

wherein $R^1$ is hydrogen, alkyl, carboxylate, or a carboxylate derivative;

X is —NH— or —O—;

Z is selected from alkyl, cycloalkyl, alkyloxy, and polyalkyloxy, where each of the foregoing is substituted with at least one group selected from hydroxy, thiol, amino; or Z is selected from carbohydrates and carbohydrate derivatives. In one aspect, Z is hydroxy or polyhydroxy substituted alkyl, alkyloxy, or alkylalkyloxy, such as $(CH_2CH_2)_nOH$, $(CH_2)_p(OCH_2CH_2)_nOH$, and the like, where n and p are each independently selected integers in the range from 1 to about 10. In another aspect, Z is a carbohydrate, including pyranoses and furanoses, and deoxyamino variations thereof. In another aspect, Z is amino-deoxyglucose, amino-deoxymannose, and the like.

In another embodiment, the monomer is a compound of the formula:

$$Z-(CH_2)_n-Y-C(O)C(R^1)=CH_2$$

wherein

Z is independently selected from OH, $NH_2$, and SH, n is about 1 to about 10,

X is —NH— or —O—;

$R^1$ is H, alkyl, carboxylate, or a carboxylate derivative.

In another embodiment, the monomer is a compound of the formula:

$$Z-(CH_2)_n-NH-COC(R^1)=CH_2$$

wherein

Z is independently selected from OH, $NH_2$, SH, n is about 1 to about 10, and $R^1$ is H, alkyl, carboxylate or a carboxylate derivative.

In another embodiment, the monomer is a compound of the formula:

$$Z-X-COC(R^1)=CH_2$$

wherein

Z is $NH_2$, OH, or SH;

X is a carbohydrate, including pyranoses, furanoses, and the like, or a derivative thereof;

$R^1$ is selected from H, alkyl, carboxylate, and a carboxylate derivative.

In another embodiment, the cross-linking reagent is a compound of the formula:

$$CH_2=C(R^1)CONH-(CH_2)_n-(Q)_m-(CH_2)_n-NHCO(R^1)C=CH_2$$

wherein n is independently selected in each instance from an integer in the range from 0 to about 10;

$R^1$ is selected from hydrogen, alkyl, carboxylate, and carboxylate derivatives;

Q is independently selected in each instance from alkylene, alkyleneoxy, alkyleneamino, alkenethio, and carbonyl;

and m is an integer from about 1 to about 10. In one variation, each of said alkylene, alkyleneoxy, alkyleneamino, or alkenethio is optionally substituted.

In another embodiment, the cross-linking reagent is a compound of the formula:

$$H_2C=C(R^1)C(O)NH-((CH_2)_2O)_n-(CH_2)_2-NH-COC(R^1)=CH_2$$

wherein n is 0 to 20, and $R^1$ is H, alkyl, carboxylate, or a carboxylate derivative.

In another embodiment of the invention, the cross-linking reagent is a compound of the formula:

$$H_2C=C(R^1)CO-Y-Q-(CH(Z))_m-Q-Y-COC(R^1)=CH_2$$

wherein $R^1$ is hydrogen, alkyl, carboxylate, or a carboxylate derivative,

Y is independently selected in each instance from —NH— or —O—;

Q is independently selected in each instance from alkylene, alkyleneoxy, alkyleneamino, each of which is optionally substituted with one or more substituents selected from the group consisting of —OH and —$NH_2$, m is 1 to 5; and Z is independently selected in each instance from —SH, —NH$_2$, and —OH.

In one aspect, Q is —(CH$_2$)— in each instance. In another aspect, Y is —NH— in each instance. In another aspect, m is 1 to 3.

In another embodiment of the invention, the cross-linking reagent is a compound of the formula:

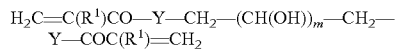

wherein R$^1$ is independently selected in each instance from hydrogen or alkyl, including methyl;

Y is independently selected in each instance from —NH— and —O—, and m is an integer from 1 to about 5.

In one aspect, Y is —NH— in each instance. In another aspect, m is an integer from 1 to 3.

In another embodiment of the invention, the cross-linking reagent is a compound of the formula:

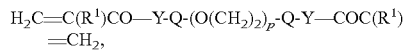

wherein R$^1$ is independently selected in each instance from hydrogen or alkyl, Y is independently selected in each instance from —NH— or —O—, Q is independently selected in each instance from alkylene, alkyleneoxy, alkyleneamino, each of which is optionally substituted with one or more substituents selected from the group consisting of —OH, —SH, and —NH$_2$, and p=1 to 20, In one aspect, R$^1$ is hydrogen or methyl in each instance. In another aspect, Y is —NH— in each instance. In another aspect, Q is independently selected in each instance from alkylene and alkyleneoxy. In another aspect, p=1 to 3.

Also described herein is method for immobilizing one or more biomolecules to a substrate. The biomolecules include at least one unsaturated acid group, or derivative thereof. The method includes the steps of:

(a) mixing the biomolecule with a gel-forming composition described herein to form a mixture;

(b) applying the mixture to the substrate; and (c) polymerizing the mixture;

The gel forming composition includes one or more of the monomers and one or more of the cross-linking reagents, and derivatives thereof, described herein. In one illustrative embodiment, the substrate is selected from glass, quartz, plastics, silicon, and the like.

In another illustrative embodiment, the gel-forming reagent included in the mixing step comprises concentrations from about 0.1 to about 1 M, or alternatively from about 0.35 to about 0.5 M, of the gel-forming monomer; and from about 0.001 to about 0.1 M, or alternatively from about 0.0175 to about 0.025 M, of the cross-linker or cross-linking reagent.

In another illustrative embodiment, the gel-forming reagent also includes glycerol as a solvent. Illustratively, the glycerol is present in the solvent from about 50% to about 80%, or alternatively from about 55% to about 75%, by weight. In another illustrative embodiment, the gel-forming reagent also includes about 0.2 M sodium phosphate buffer in the solvent. In one aspect, the 0.2 M sodium phosphate buffer is present in the solvent from about 50% to about 20%, or alternatively from about 45% to about 25%, by weight.

The polymerizing step may be accomplished with any conventional initiation, including but not limited to initiation using radiation, such as exposure to ultraviolet (UV) light, or chemical initiation, such as by exposure to a radical initiator, cationic initiator and/or anionic initiator.

Figure 2:
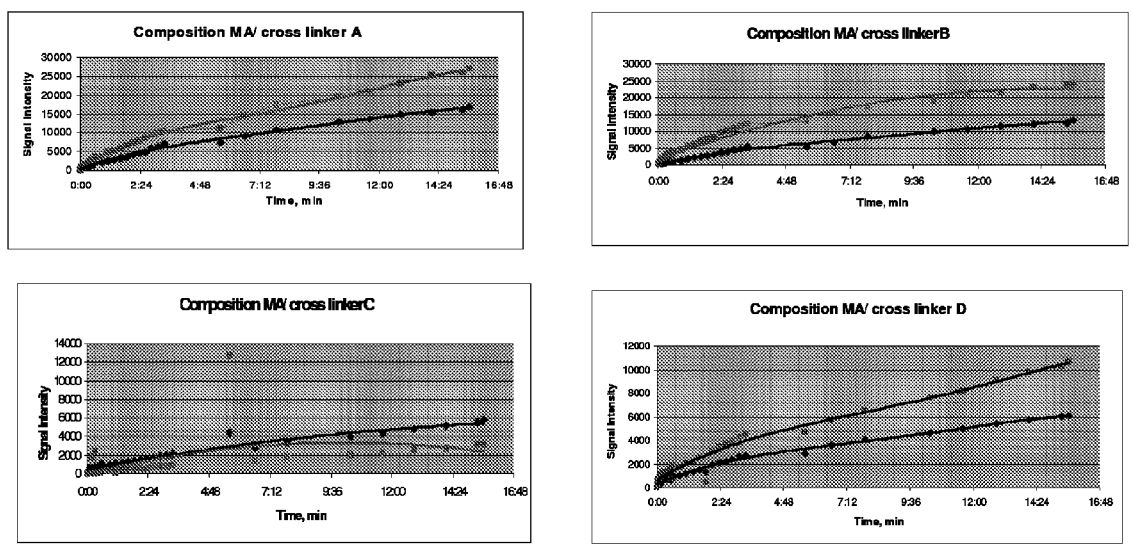
FIG. 2 shows the results of hybridization experiments on gel-drop microarrays of an immobilized 20-mer oligonucleotide probe and a 50-mer target DNA fragment, where the probe was immobilized by various gel forming compositions described herein and that include methacrylamide (, 0.47 M methacrylamide, 0.0235 M cross-linker A, B, C, or D, 65% glycerol, 0.2 M sodium-phosphate buffer (pH 7.2)) compared to the conventional gel forming composition prepared from acrylamide and N,N-methylenebisacrylamide (♦, 0.47 M acrylamide, 0.0235 M methylenebisacrylamide, 65% glycerol, 0.2 M sodium-phosphate buffer (pH 7.2)).

In one illustrative embodiment, the gel-drop microarrays containing 20-mer oligonucleotide probes were prepared by co-polymerization approach using new gel-forming reagents presented on FIG. 1. Hybridization experiments performed with 50-mer and 100-mer target DNA fragments demonstrate that new gel-forming reagents and compositions thereof show similar and higher rates of hybridization process if compared with standard methacrylamide compositions (FIGS. 2 and 3). In one aspect, gel-forming monomers described herein possess lower volatility (FIG. 4). In another aspect, gel-forming monomers described herein provide more stable gel forming compositions that are less prone to premature polymerization.

In another illustrative embodiment, the immobilized biomolecule is a nucleic acid, and the unsaturated or acrylate functional group may be covalently attached at various locations on the nucleic acid, including the 3' end, and the 5' end.

In another illustrative embodiment, the immobilized biomolecule is a peptide or protein, and the unsaturated or acrylate functional group may be covalently attached at various locations on the peptide or protein, including the N-terminus.

EXAMPLES

N-Hydroxysuccinimide methacrylate (NHS-MA). Methacryloyl chloride (0.1 mol) in 25 ml of tetrahydrofuran was added dropwise with stirring and ice cooling to the solution of N-hydroxysuccinimide (0.1 mol) and triethylamine (0.1 mol) in 100 ml of tetrahydrofuran. After 1 hour of stirring at room temperature the precipitate is removed and filtrate is evaporated in vacuum. The residue was crystallized from methanol to give the product with 75% yield. M.P. 102-104° C.; M.p. lit. 103° C. (H.-G. Batz et al. Angew. Chem. Intern. Edit., 1972, v.11, N12, 1103-1104).

N-(Hydroxyethyl)-methacrylamide (HEMA, Compound M1). To solution of ethanolamine (0.67 g, 11 mmol) in 50 ml of acetonitrile, a solution of NHS-MA (1.83 g, 10 mmol) in 25 ml of acetonitrile was added. The reaction mixture was stirred 20 min at room temperature and then concentrated in vacuum. The residue was purified by column chromatography on silica gel applying gradient 0-5% of acetone in dichloromethane. The final product was obtained with 81% yield (1.05 g). FAB-MS: 130.1 (M+H)$^+$. Calc. for C$_6$H$_{11}$NO$_2$: MW 129.04.

N-Methacryloyl-D-glucosamide (MGA, Compound M2). To a stirred mixture of 2-deoxy-D-glucosamine hydrochloride (2.5 g, 12 mmol) and triethylamine (2.52 g, 25 mmol) in methanol methacryloyl chloride (1.4 ml, 13 mmol) was added dropwise at 0-5° C. Then the reaction mixture was stirred at room temperature during 3 hours, the volatiles were removed under vacuum. The resulting residue was purified by chromatography on silica gel column using chloroform-methanol (1:1) as a mobile phase to give product as a white crystals (2.33 g, 77%). FAB-MS: 248.2 (M+H)$^+$. Calc. for C$_{10}$H$_{12}$NO$_6$: MW 247.04.

2-Hydroxypropylene-1,3-bismethacrylamide (Compound B). A mixture of 1,3-diamino-2-hydroxypropane (0.9 g, 10 mmol), NHS-MA (3.84 g, 21 mmol) and triethylamine (2.02 g, 20 mmol) were dissolve in 50 acetonitrile 950 ml) and stirred at room temperature during 1.5 hours. The solvent was removed under vacuum, and the crude material was portioned between water and ether (3×20 ml). Organic phases were combined, concentrated in vacuum, and purified by silica gel column chromatography applying gradient 0-10% acetone in chloroform. The yield of resulting product consist 82% (1.87 g). FAB-MS: 228.1 (M+2H)$^+$. Calc. for $C_{11}H_{18}N_2O_3$: MW 226.08.

N,N-Dimethacryloyl-1,4-diaminobutane-2,3-diol (Compound C). To 1,3-butadiene diepoxide (4.3 g, 0.05 mmol) placed in a two-necked flask equipped with a condenser, dropping funnel and magnetic stirrer ammonium hydroxide (15 ml of 32% water solution) was added, and the contents allowed to stir at room temperature. After 3 hours reaction mixture was evaporated to dryness and co-evaporated with ethanol. To a solution of above residue in ethyl alcohol (150 ml) triethylamine (10.1 g, 0.1 mol) and methacrylic anhydride (16.0 g, 0.103 mol) were added. The mixture was stirred at room temperature for 5 hours, and resulting solution was concentrated to dryness under reduced pressure. Chloroform (200 ml) was added to the residue and resulting mixture was washed with water (50 ml), dried under sodium sulfate, concentrated under vacuum and purified by silica gel column chromatography applying gradient 0-10% methanol in chloroform to give compound C as an oil with the yield 15% (3.9 g). FAB MS: 252.1 (M+H)$^+$. Calc. for $C_{12}H_{20}N_2O_4$: MW 256.08.

Synthesis of methacrylamido-modified oligonucleotides. Oligonucleotide synthesis was carried out on an AB 394 DNA/RNA synthesizer (Applied Biosystems US) in 1 umol scale using commercial β-cyanoethyl phosphoramidite (Glen Research Corporation, Sterling, Va., US). Methacrylamido-modifiers CPG (custom-made) were used as a solid phase for synthesis of oligonucleotides containing methacrylic function at 3'-ends. 0.1M solution of methacrylating phosphoramidites (custom-made) in acetonitrile were used according the standard conditions of the reaction cycle for phosphoramidite chemistry for the incorporation of methacrylamide function at 5'-end or at internal position of oligonucleotides. The cleavage of oligonucleotides from the CPG and removing of protecting groups were performed following the standard procedure, and obtained product was purified by RP HPLC. Solutions obtained after HPLC purification were evaporated to dryness (CentiVap concentrator, Labconco, Kansas City, Mo., US), and residues were dissolved in 500 mkl of Milli-Q water for estimation of DNA concentration by UV absorption (UV/VIS Spectrophotometer Lambda Bio 10, Perkin Elmer, Boston, Mass., US). After that oligonucleotide solutions were dried out by CentiVap concentrator (Labconco, Kansas City, Mo., US) and redissolved in Milli-Q water to final concentration of 2 mM. Probes were stored at −20° C. until use.

Synthesis of fluorescent labeled oligonucleotides. 50-mer and 100-mer oligonucleotides containing sequences complementary to 20-mer probes using for gel-drops microarray fabrication and labeled with Lissamine Rhodamine by 3'-end were synthesized by standard solid phase phosphoramidite method on 394 Applied Biosystems DNA/RNA Synthesizer (Applied Biosystems Inc., Foster City, Calif., US). After deprotection procedure synthesized oligonucleotides were purified by reverse phase HPLC. For incorporation of fluorescent label 50 U of purified oligonucleotides were dissolved in 50 µl of 0.2M NaHCO$_3$, and Lissamin Rhodamin sulfonyl chloride (water solution, 1 mg/100 mkl) was added in two portions in 50 µl. Reaction was carried out at 4° C. during 2 hours. Then the products were precipitated by addition of 1.5 ml 1% LiClO$_4$ in acetone followed by centrifugation (13,000 RPM, 5 min, centrifuge Galaxy 16 DH, Eppendorf, Westbury, N.Y., US). Obtained precipitates were dissolved in 100 µl of Milli-Q water and applied on reverse phase HPLC column for purification to give 3.5-4 OU of labeled oligonucleotides.

Preparation of copolymerization mixtures. Solutions for the preparation of microarray by copolymerization method contained gel-forming monomer (0.47M); cross-linker reagent (0.0235M); glycerol (65% v/v Aldrich, Milwaukee, Wis., US), 0.2 M sodium-phosphate buffer (pH 7.2). Aliquotes of oligonucleotide probe solutions were dried in vacuum (CentiVap concentrator, Labconco, Kansas City, Mo., US) and then redissolved in copolymerization mixture with final concentration 0.25 mM. Obtained solutions were placed in 384-well microtitration plate (20 mkl/well) (Genetix, New Milton, UK) for further printing procedure.

Fabrication of Copolymerization microarrays. Copolymerization microarrays were printed on plain microscope slides (Cat. No. 12-544-1, Fisher Scientific, Pittsburgh, Pa.) using technique as previously described. The slides were prepared for printing according the following protocol: (a) immerse in 5 M sodium hydroxide solution for 30 minutes; (b) rinse five times with double-distilled water; (c) immerse in concentrated sulfuric acid in for 30 minutes; (d) rinse five times with double-distilled water; (e) air dry for 1 hour. After the cleaning, the slides were immersed in 5% solution of 3-(Trimethoxysilyl)propyl methacrylate (Aldrich, Saint Louis, Mo.) in dichloromethane, incubated for 40 min at room temperature, thoroughly rinsed with ethanol, double-distilled water, and finally dried in a flow of nitrogen.

Copolymerization mixtures were printed with a QArray2 arrayer (Genetix, New Milton, UK) using four "solid" 150 µm pins. On completion of printing, the slides were incubated overnight in an airtight container with 2 to 4 ml of a mixture that included all the components of the mixture used for printing the arrays except the oligonucleotides. After the incubation, the slides were placed in an airtight cassette equipped with quartz windows and polymerized for 30 min in a nitrogen atmosphere under a Thermo Spectronic Model XX-15A UV lamp (Cat. No. 11-982-120, Fisher Scientific, Pittsburgh, Pa.) with 312 nm tubes Model FB-T1-110A (Fisher Scientific). Finally, the slides were transferred to an ArrayIt™ High-Throughput Wash Station (Telechem International, Sunnyvale, Calif.) filled with 400 ml of 0.01M SSPE washing buffer (Ambion, Austin, Tex.), washed for 1 hour on a Nuova stirring hot plate (Barnstead/Thermolyne, Dubuque, Iowa), thoroughly rinsed with MilliQ water, and air dried.

Hybridization experiments. Hybridization of target DNA fragments with gel-drop microarrays was carried out in 25 mkl reaction chamber in hybridization buffer containing 0.01 M sodium-phosphate buffer (pH 7.2), 1 M NaCl, 1 mM EDTA, 0.1% (w/v) Tween-20. The concentrations of fluorescent labeled oligonucleotides in hybridization mixtures consisted 10 fmol/mkl for 50-mer target and 50 fmol/mkl for 100-mer one.

Hybridization was carried out at room temperature during at 12-24 hours. Fluorescence analysis of hybridization responses was performed directly in hybridization solution by using of custom-built fluorescence microscope (described in V Barsky et al, J. Biomol. Screening 7, 2002, 247-257).

Co-polymerization mixtures prepared with different gel-forming monomers were applied on glass slides and polymerized under UV exposure with 20 min, 10 min and no delay after printing procedure. Comparative hybridization experiments on gel-drop microarrays were carried out with immobilized 20-mer oligonucloetide probe and 100-mer target DNA fragment.

Additional information useful for preparing the monomers and cross linkers described herein, for preparing biomolecules that include at least one unsaturated acid functional group, or derivative thereof, and/or for performing certain step in the methods described herein are found in the following references, each of which is incorporated herein by reference:

PRINTED PUBLICATIONS

Campas, M., Katakis I. 23 Trends in Anal. Chem., 49 (2004).
Christinsen, C. B. V. 56 Talanta, 289 (2002).
Predki, P. F. 8 Current opinion in Chemical Biology, 8 (2004).
Beaucage, S. L. 8 Current medicinal Chemistry, 1213 (2001).
Kusnezow, W., Hoheisel J. D. 33 BioTechniques, S14 (2002).
Talapatra, A., et al. 3 Pharmacogenomics, 1 (2002).
Beattie, W. G., et al. 4 Molec. Biotech., 213 (1995).
Rogers, Y.-H., et al. 266 Anal. Biochem., 23 (1999).
Joos, B., et al. 247 Anal. Biochem., 96 (1997).
Guo, Z., et al. 22 Nucl. Acids Res., 5456 (1994).
Chrisley, L. A., et al. 24 Nucl. Acids Res., 3031 (1996).
Boncheva, M., et al. 15 Langmuir, 4317 (1999).
Khrapko, K. R,. et al. 1 DNA Sequence, 375 (1991).
Raddatz S., et al., 30 Nucl. Acids Res., 4793 (2002).
Kumar P., Gupta K. C. 14 Bioconjugate Chemistry, 507 (2003).
Yousaf M. N., Mrksich M. 121 J. Am. Chem Soc., 4286 (1999).
Coffinier, Y., et al. 21 Langmuir, 1489 (2005).
Soellner, M. B., et al. 125 J. Am. Chem. Soc., 11790 (2003).
Houseman, B. T., et al. 9 Chemistry & Biology, 443 (2002).
Devaraj, N. K., et al. 127 J. Am. Chem. Soc., 8600 (2005).
Charles P. T. et al. 19 Langmuir, 1586 (2003).
Yershov, G., et al. 93 Proc. Natl. Acad. Sci. USA, 4913 (1996).
Kelly, J. J. et al. 311 Anal. Biochem, 311 (2002).
van Berkum, N. L., et al. DNA microarrays: raising the profile. Current Opinion in Biotechnology, 12, 48-52. (2001)
Sage, L. Biochips Go High-Tech. American Chemical Society, products review, 44-48 (2004).
Broude, N. E., et al. DNA Microarray With Stem-loop DNA Probes: Preparation and Applications. Nucleic Acids Res., 29, e92 (2001).
Vasiliskov, V. A., et al. Fabrication of Microarray of Gel-immobilized Compounds on a Chip by Co-polymerization. Biotechniques, 27, 592-606 (1999).
Gurevitch, D., et al. A Novel Three-dimensional Hydrogel-based Microarray Platform. JALA, technical report, 6, 87-91 (2001).
Rehman, F. N., et al. Immobilization of Acrylamide-modified Oligonucleotides by Co-polymerization. Nucleic Acids Res., 27, 649-655. (1999)
Yu, A., et al. Hydrogel Drop Microchips with Immobilized DNA: Properties and Methods for Large Scale Production. Analytical Biochem., 325, 92-106 (2004).
Yu, A., et al. Hydrogel-based Protein Microchips: Manufacturing, Properties and Applications. Biotechniques, 34, 1008-1022 (2003).

U.S. Patents and U.S. Published Applications:
U.S. Pat. No. 6,692,972 B1.
U.S. Pat. No. 6,174,683 B 1.
U.S. Patent Application US 2003/0036063 A1.
U.S. Patent Application US 2004/0241713 A1.
U.S. Utility patent application Ser. No. 11/066,791 (Feb. 25, 2005).
International Patent Application Publication WO 03/010203 A1.

What is claimed is:

1. A gel-forming composition comprising
(a) a monomer of the formula:

wherein
Z' is a carbohydrate or derivative thereof;
X is —NH— or —O—; and
$R^1$ is H, alkyl, carboxylate or a carboxylate derivative; and
(b) a cross-linker of the formula:

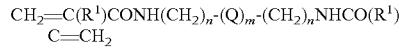

wherein
n is independently selected in each instance from an integer in the range from 0 to about 10;
$R^1$ is selected from hydrogen, alkyl, carboxylate, and carboxylate derivatives;
Q is independently selected in each instance from $C_2$-$C_{20}$ alkylene, oxyalkyloxy, aminoalkylamino, thioalkylthio, and carbonyl; where each of said $C_2$-$C_{20}$ alkylene, oxyalkyloxy, aminoalkylamino, and thioalkylthio is optionally substituted with one or more hydroxy, amino, or thiol groups;
and m is an integer from 1 to about 10.

* * * * *